C. E. ANDREWS.
PROCESS OF PURIFICATION OF CRUDE ANTHRAQUINON.
APPLICATION FILED JULY 1, 1918.
1,324,716. Patented Dec. 9, 1919.
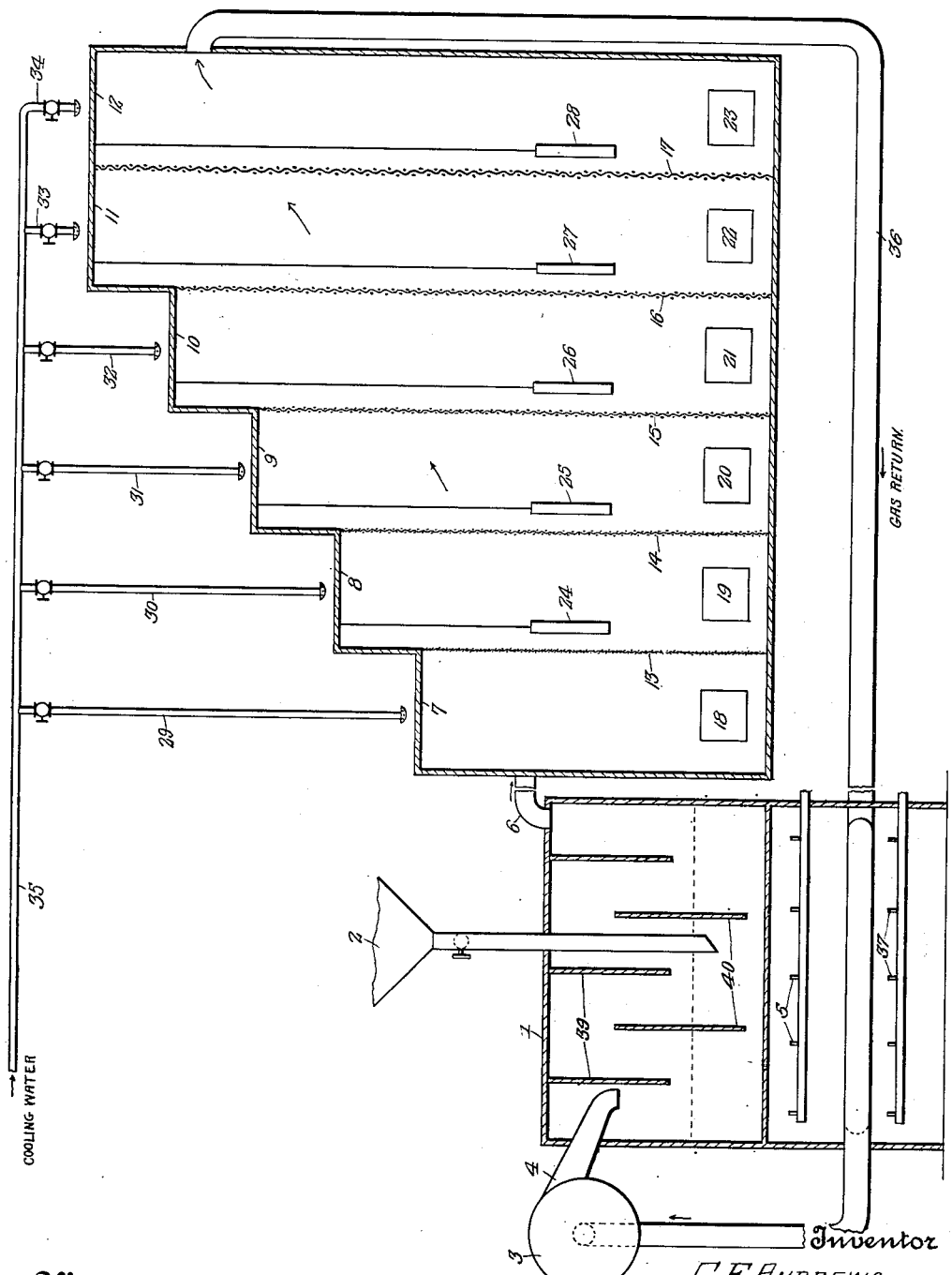

UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

PROCESS OF PURIFICATION OF CRUDE ANTHRAQUINON.

1,324,716.       Specification of Letters Patent.       Patented Dec. 9, 1919.

Original application filed February 27, 1918, Serial No. 219,447. Divided and this application filed July 1, 1918. Serial No. 242,902.

*To all whom it may concern:*

Be it known that I, CHESTER EARL ANDREWS, a citizen of the United States, residing at Pittsburgh, in the county of Allegheny and State of Pennslyvania, have invented certain new and useful Improvements in Processes of Purification of Crude Anthraquinon, of which the following is a specification.

The present invention relates to the purification of crude anthraquinon, by separating the same substantially from other bodies with which the same is mixed, and as a specific example, I cite the product produced by the oxidation of anthracene or crude anthracene for the production of anthraquinon, there being in this mixture or product the following products:

Anthracene—melting point 213° C., boiling point 351° C.

Anthraquinon—melting point 285° C., boiling point, 382° C.

Phenanthrene—melting point 99° C., boiling point, 340° C.

Phenanthraquinon—melting point 198° C., boiling point 360° C.

Methyl anthracene—melting point 190° C., boiling point 360° C.

Methyl anthraquinon, melting point, 177° C., sublimes above 360° C.

The preferred mode of carrying out the process is as follows:—The crude material is heated in a current of air, or other inert gas, such as chimney gas, nitrogen, carbon dioxid, natural gas, or the like, to the temperature of about 300° C., and current of air or gas containing the vapors of some or all of the above mentioned materials is passed into a cooled chamber, or preferably a series of chambers, each of which is a little cooler than the preceding chamber. If desired, the gases which issue from the last chamber may be brought back and reintroduced into the receptacle containing the material under treatment.

In the operation of the process, the substance having the lowest boiling point will vaporize first from the mixture, whereas the substance having the highest boiling point will tend to remain in the mixture under treatment, particularly when the boiling points of the constituents of the mixture are rather far apart. The process may be operated by driving off from a mixture of two substances, the major part of the more volatile of such substances, while leaving in the mixture, the major part of the less volatile of such substances.

In the above example, air is a suitable gas vehicle, in which to effect the sublimation of most of the substances mentioned, under the temperature conditions specified. In other examples which might be given, air is not a suitable gas vehicle to employ, since many substances would undergo deleterious oxidation, if treated in a current of air, and for such materials I may employ other gas vehicles, such as purified chimney gas, $CO_2$, nitrogen, water gas, hydrogen, natural gas and various others, it, of course, being understood that the gas to be selected is one which will not injuriously affect the materials under treatment.

Without limiting myself to a specific arrangement of apparatus, I have illustrated in the accompanying drawing a longitudinal section of an apparatus which may conveniently be used in carrying out the process. In said apparatus the material to be separated is placed into a box-like vaporizer 1, provided with a filling funnel 2, or equivalent filling means, and a blast of gas suitable for use as a vehicle is introduced from the centrifugal pump 3 by pipe 4. The receptacle 1 may be heated in any convenient manner, for example, by gas burners 5 placed below the same, and the current of gases and liquids produced in the vaporizer 1 may be carried through the pipe 6 into a suitable condensing chamber. This chamber contains a number of compartments of successively increasing height, illustrated from 7 to 12 respectively, and separated by screens of wire gauze 13 to 17, and the successive compartments are provided with a series of doors 18 to 23, inclusive, for removing the crystallized or sublimed matter collected in the several compartments. Elements 24 to 28, inclusive, are flat weights carried upon suitable rods, which weights may be swung out from time to time and allowed to bump against the screens, for the purpose of knocking off the accumulated sublimate. Cooling water may be supplied to the exterior of some one or more, or even all of these compartments by valved pipes 29 to 34, inclusive, fed from pipe 35, for the purpose of separately and independently cooling the several compartments of the condenser in a regulable manner.

The gases leaving the last condenser may be brought back through the pipe 36 to the pump 3, for reintroduction into the system, and if desired, a coil of pipe placed below the receptacle 1 may be heated by means of suitable gas burners 37, to approximately the same temperature as to that at which the material in tank 1 is to be maintained. The tank 1 may be provided with downwardly extending baffles 39, and upwardly extending baffles 40, in order to make the gases follow a tortuous course.

The present case is a division of my copending application 219,447, filed February 27, 1918. In said application I have disclosed a considerable number of examples of mixtures of materials which can be separated into their component parts, by vaporization and fractional crystallization, using a current of an inert gas, as herein set forth, and have made claims generic to such examples, such claims, of course, including the example given in the present case.

What I claim is:

1. In the separation of anthracene from anthraquinon, the step of vaporizing into a gas current, at about 300° C., a part at least of a mixture of such materials, and separately crystallizing at different locations, the several vaporized ingredients.

2. The process of separating anthraquinon from the product resulting from the oxidation of crude anthracene, which comprises heating the said oxidation product in a flowing gas current to a temperature of about 300° C., whereby a portion of said material is vaporized and is carried along in the gas current, slowly cooling the gas current in a plurality of stages to cause separate condensation of the said ingredients in such several stages.

In testimony whereof I affix my signature.

CHESTER E. ANDREWS.